United States Patent [19]
Hoshi et al.

[11] Patent Number: 5,798,873
[45] Date of Patent: Aug. 25, 1998

[54] SMALL-SIZED ZOOM LENS

[75] Inventors: Koji Hoshi; Takeshi Nishimura, both of Kanagawa-ken, Japan

[73] Assignee: Canon Kabushiki Kaisha, Tokyo, Japan

[21] Appl. No.: 921,522

[22] Filed: Sep. 2, 1997

Related U.S. Application Data

[63] Continuation of Ser. No. 344,637, Nov. 18, 1994, abandoned.

[30] Foreign Application Priority Data

Nov. 25, 1993 [JP] Japan ................. 5-318969

[51] Int. Cl.$^6$ ................. G02B 15/14; G02B 3/02
[52] U.S. Cl. ................. 359/692; 359/713
[58] Field of Search ................. 359/692, 713, 359/714, 690, 688, 687, 683

[56] References Cited

U.S. PATENT DOCUMENTS

| | | | |
|---|---|---|---|
| 5,168,403 | 12/1992 | Umeda et al. | 359/692 |
| 5,327,290 | 7/1994 | Fukushima et al. | 359/692 |
| 5,353,162 | 10/1994 | Ito et al. | 359/692 |
| 5,386,321 | 1/1995 | Kawamura | 359/692 |
| 5,398,135 | 3/1995 | Ohashi | 359/692 |
| 5,434,712 | 7/1995 | Ito | 359/692 |
| 5,459,616 | 10/1995 | Kawamura et al. | 359/692 |

FOREIGN PATENT DOCUMENTS

| | | |
|---|---|---|
| 56-128911 | 10/1981 | Japan |
| 57-201213 | 12/1982 | Japan |
| 60-170816 | 9/1985 | Japan |
| 60-191216 | 9/1985 | Japan |
| 62-56917 | 3/1987 | Japan |
| 62-90611 | 4/1987 | Japan |
| 62-113120 | 5/1987 | Japan |
| 62-256915 | 11/1987 | Japan |
| 62-284319 | 12/1987 | Japan |
| 63-161422 | 7/1988 | Japan |
| 6452111 | 2/1989 | Japan |
| 1193807 | 8/1989 | Japan |
| 2284109 | 11/1990 | Japan |
| 3116110 | 5/1991 | Japan |
| 3127008 | 5/1991 | Japan |

*Primary Examiner*—Georgia Y. Epps
*Assistant Examiner*—Jordan M. Schwartz
*Attorney, Agent, or Firm*—Fitzpatrick, Cella, Harper & Scinto

[57] ABSTRACT

A small-sized zoom lens is disclosed comprising, from front to rear, a first lens unit of positive refractive power and a second lens unit of negative refractive power, zooming being performed by varying the separation between the first and second lens units, wherein the first lens unit has a negative lens and at least two positive lens, the second lens unit has a first lens and a negative second lens having a concave surface facing the object side, and the second lens unit has at least one aspheric surface, and wherein proper rules of lens design are set forth for the focal lengths f1 and f2 of the first and second lens units, the shortest focal length fw of the entire system, the refractive index N2F and Abbe number v2F of the material of the first lens, and the focal lengths f2F and f2R of the first and second lenses.

12 Claims, 9 Drawing Sheets

FIG.3A
FNO/6.07

SPHERICAL ABERRATION
SINE CONDITION

ASTIGMATISM

DISTORTION(%)

LATERAL CHROMATIC
ABERRATION (g-LINE)

FIG.4A
FNO/9.26

SPHERICAL ABERRATION
SINE CONDITION

ASTIGMATISM

DISTORTION(%)

LATERAL CHROMATIC
ABERRATION (g-LINE)

FIG.5A
Fno / 4.66

SPHERICAL ABERRATION
SINE CONDITION

FIG.5B
$2\omega = 57.9°$

ASTIGMATISM

FIG.5C
$2\omega = 57.9°$

DISTORTION(%)

FIG.5D
$2\omega = 57.9°$

LATERAL CHROMATIC
ABERRATION (g-LINE)

FIG.6A
Fno / 6.07

SPHERICAL ABERRATION
SINE CONDITION

FIG.6B
$2\omega = 46.0°$

ASTIGMATISM

FIG.6C
$2\omega = 46.0°$

DISTORTION(%)

FIG.6D
$2\omega = 46.0°$

LATERAL CHROMATIC
ABERRATION (g-LINE)

FIG.7A
F_NO / 9.27

SPHERICAL ABERRATION
SINE CONDITION

FIG.7B
2ω = 31.1°

ASTIGMATISM

FIG.7C
2ω = 31.1°

DISTORTION(%)

FIG.7D
2ω = 31.1°

LATERAL CHROMATIC
ABERRATION (g-LINE)

FIG.8A
F_NO / 4.66

SPHERICAL ABERRATION
SINE CONDITION

FIG.8B
2ω = 57.9°

ASTIGMATISM

FIG.8C
2ω = 57.9°

DISTORTION(%)

FIG.8D
2ω = 57.9°

LATERAL CHROMATIC
ABERRATION (g-LINE)

FIG.9A F_{NO}/5.92
SPHERICAL ABERRATION SINE CONDITION

FIG.9B 2ω=47.1°
ASTIGMATISM

FIG.9C 2ω=47.1°
DISTORTION(%)

FIG.9D 2ω=47.1°
LATERAL CHROMATIC ABERRATION (g-LINE)

FIG.10A F_{NO}/9.04
SPHERICAL ABERRATION SINE CONDITION

FIG.10B 2ω=31.8°
ASTIGMATISM

FIG.10C 2ω=31.8°
DISTORTION(%)

FIG.10D 2ω=31.8°
LATERAL CHROMATIC ABERRATION (g-LINE)

FIG.11A  F_{NO}/4.66
SPHERICAL ABERRATION
SINE CONDITION

FIG.11B  2ω=57.9°
ASTIGMATISM

FIG.11C  2ω=57.9°
DISTORTION(%)

FIG.11D  2ω=57.9°
LATERAL CHROMATIC
ABERRATION (g-LINE)

FIG.12A  F_{NO}/6.00
SPHERICAL ABERRATION
SINE CONDITION

FIG.12B  2ω=46.6°
ASTIGMATISM

FIG.12C  2ω=46.6°
DISTORTION(%)

FIG.12D  2ω=46.6°
LATERAL CHROMATIC
ABERRATION (g-LINE)

SMALL-SIZED ZOOM LENS

This application is a continuation of application Ser. No. 08/344,637 filed Nov. 18, 1994, now abandoned.

BACKGROUND OF THE INVENTION

1. Field of the Invention

This invention relates to small-sized zoom lenses comprised of two lens units suited to leaf shutter cameras or video cameras and, more particularly, to small-sized wide-angle zoom lenses having a range of about 2 which are well corrected for aberrations by setting forth proper rules of design for each lens unit and shortened in the total length (the distance from the first lens surface to the image plane).

2. Description of the Related Art

Recent development of leaf shutter cameras or video camera of reduced size demands for shortening the total length of the photographic lenses therefor. Even in the field of leaf shutter cameras or like compact cameras whose lenses are not interchangeable, particularly the zoom type is desired to use therein. To this purpose, it is required that the size of the zoom lens be as much small as equal to that of the mono-focal length lenses which were heretofore conventionally used.

It has been known to provide zoom lenses of reduced size, or so-called "2-unit" zoom lenses comprising, from front to rear, a first lens unit of positive refractive power and a second lens unit of negative refractive power with the separation therebetween being made variable for zooming, as are proposed in Japanese Laid-Open Patent Applications Nos. Sho 56-128911, Sho 57-201213, Sho 60-170816, Sho 60-191216 and Sho 62-56917.

In these documents, with the use of such plus-minus refractive power arrangement as counted from the object side, the back focal distance is made relatively short and, moreover, a shortening of the total length of the entire lens system is achieved, while still permitting high optical performance to be maintained throughout. Thus, the 2-unit zoom lenses are realized as such.

Besides these, there are Japanese Laid-Open Patent Applications Nos. Sho 62-284319, Sho 62-256915, Sho 64-52111 and Hei 1-193807 disclosing that the first lens unit of positive refractive power and the second lens unit of negative refractive power are both made to move toward the the object side, while simultaneously varying their separation, when zooming from the wide-angle end to the telephoto end.

Another 2-unit zoom lens as disclosed in Japanese Laid-Open Patent Application No. 63-161422 has its first lens unit constructed with positive, negative, negative, positive and positive lenses, five in total, and an angle of field for the wide-angle end of about 55 degrees.

In the 2-unit zoom lenses of another Japanese Laid-Open Patent Applications Nos. Sho 62-90611, Sho 62-113120 and Hei 3-116110, the first lens unit is constructed with positive, negative, negative and positive lenses, four in total, and the zoom ratio is about 1.5.

Further, Japanese Laid-Open Patent Application No. Hei 2-284109 discloses a 2-unit zoom lens comprising a first lens unit having positive, negative, negative, positive and positive lenses, five in total, and a second lens unit having positive, negative and negative lenses, three in total.

With the use of the above-described two lens units, or the first lens unit of positive refractive power and the second lens unit of negative refractive power, in the zoom lens, when to simultaneously fulfill the requirements of reducing the bulk and size of the entire lens system, of increasing the zooming range to 2 or thereabout and of maintaining good stability of optical performance throughout the entire zooming range, there is need to set forth proper rules of design for the constituent lenses of each lens unit.

For the 2-unit zoom lens in, for example, Japanese Laid-Open Patent Application No. Hei 3-127008, the reduction of the size of the entire lens system is relied on decreasing the total number of constituent lenses. However, since many aspheric surfaces are in use, the tolerances for assembling are severe. Therefore, a problem arises in that the presence of decentering, if any, greatly lowers the optical performance.

Another method of shortening the total length of the entire lens system is to strengthen the refractive powers of both first and second lens units, because, in the general case, this shortens the total zooming movement of each of the lens units.

However, if the refractive power of each lens unit is merely strengthened, the variation of aberrations with zooming increases largely, giving rise to a problem that this becomes difficult to correct well.

SUMMARY OF THE INVENTION

The present invention is applied to the so-called 2-unit zoom lens by setting forth proper rules of design for the form and the construction and arrangement of the constituent lenses of the lens units. It is, therefore, an object of the invention to provide a small-sized zoom lens, in particular a one which has a zoom ratio of about 2 and a wide maximum angle of field with the total length of the entire lens system being shortened, while still permitting good stability of high optical performance to be maintained throughout the entire zooming range.

A small-sized zoom lens of the invention comprises, from front to rear, a first lens unit of positive refractive power and a second lens unit of negative refractive power, zooming being performed by varying the separation between the first and second lens units, wherein the first lens unit has a negative lens and at least two positive lenses and the second lens unit has a first lens and a negative second lens having a concave surface facing the object side, and the second lens unit has at least one aspheric surface, and wherein letting the focal lengths of the first and second lens units be denoted by f1 and f2, respectively, the shortest focal length of the entire system by fw, the refractive index and Abbe number of the material of the first lens by N2F and ν2F, respectively, and the focal lengths of the first and second lenses by f2F and f2R, respectively, the following conditions are satisfied:

$$0.4 < f1/fw < 0.9 \tag{1a}$$

$$0.444 < |f2/fw| < 0.671 \tag{2a}$$

$$1.055 < N2F - (\nu 2F/200) < 1.505 \tag{3a}$$

$$-0.142 < f2R/f2F < 0.078 \tag{4a}$$

Particularly, for the second lens, the following condition is satisfied:

$$2.025 < \nu N2R + \nu 2R/125 < 2.151 \tag{5a}$$

or $$N2R < 1.65 \tag{6a}$$

where N2R and ν2R are the refractive index and Abbe number of the material of the second lens, respectively.

Another zoom lens comprises, from front to rear, a first lens unit of positive refractive power and a second lens unit of negative refractive power, zooming being performed by varying the separation between the first and second lens units, wherein the first lens unit has a negative lens and at least two positive lenses, and the second lens unit has a first lens and a negative second lens having a concave surface facing the object side, and the second lens unit has at least one aspheric surface, and wherein letting the focal lengths of the first and second lens units be denoted by f1 and f2, respectively, the shortest focal length of the entire system by fw and the refractive index and Abbe number of the material of the second lens by N2R and v2R, respectively, the following conditions are satisfied:

$$0.4 < f1/fw < 0.9 \quad (1b)$$

$$0.444 < |f2/fw| < 0.671 \quad (2b)$$

and either $$2.025 < N2R + v2R/125 < 2.151 \quad (5b)$$

or $$N2R < 1.65 \quad (6b)$$

Particularly, for the aforesaid first and second lenses, the following conditions are satisfied:

$$1.055 < N2F - (v2F/200) < 1.505 \quad (3b)$$

$$-0.142 < f2R/f2F < 0.078 \quad (4b)$$

where N2F and v2F are the refractive index and Abbe number of the material of the first lens, respectively, and f2F and f2R are the focal lengths of the first and second lenses, respectively.

In these drawings,

L1: First Lens Unit;

L2: Second Lens Unit;

SP: Stop;

d: Spectral d-line;

g: Spectral g-line;

S: Sagittal Image Surface; and

M: Meridional Image Surface.

DETAILED DESCRIPTION OF THE PREFERRED EMBODIMENTS

Figure 1A:
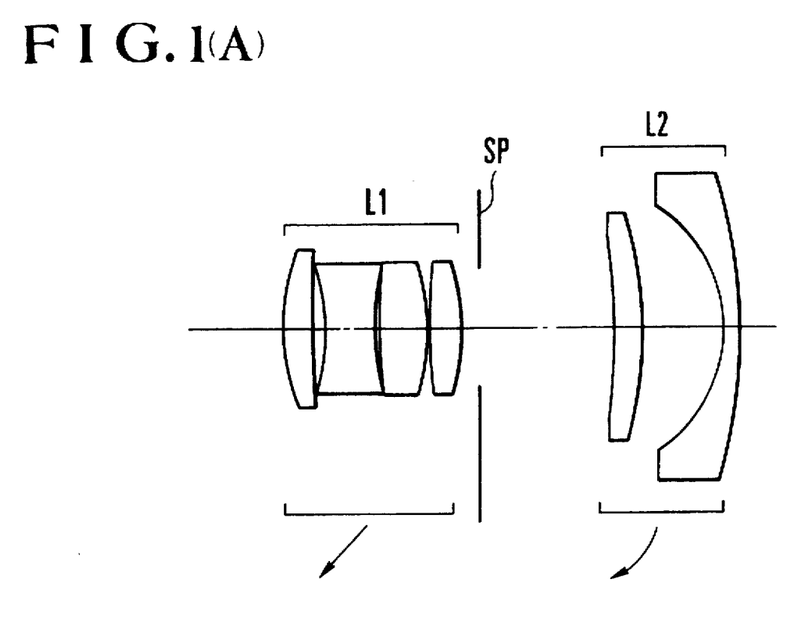
FIGS. 1(A) and 1(B) are lens block diagrams of a numerical example 1 of the invention.
Figure 1B:
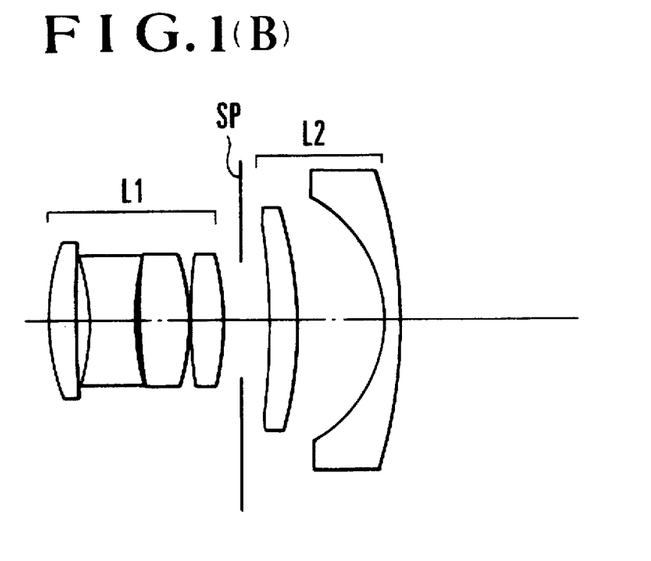
Figures 2A, 2B:
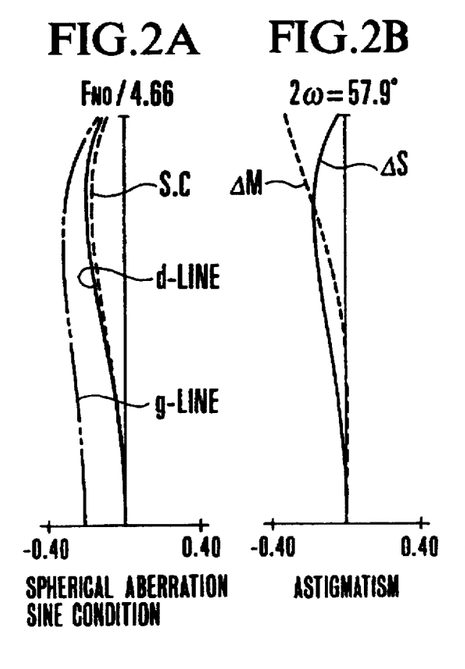
FIGS. 2A, 2B, 2C, and 2D are graphic representations of the aberrations of the numerical example 1 of the invention in the wide-angle end.
Figure 2C:
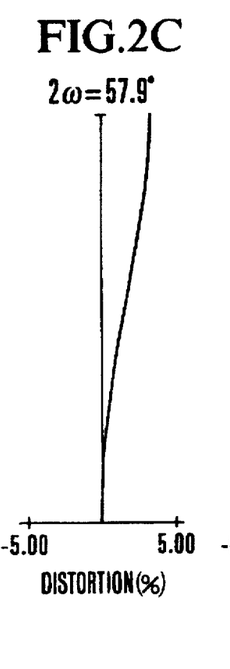
Figure 2D:
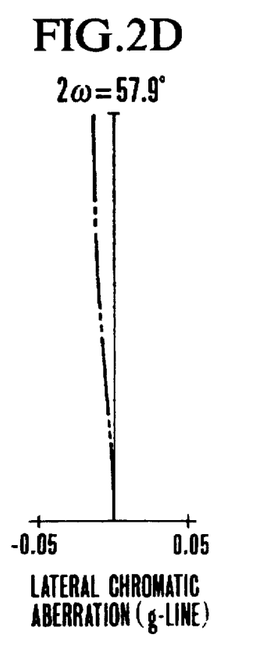
Figures 3A, 3B:
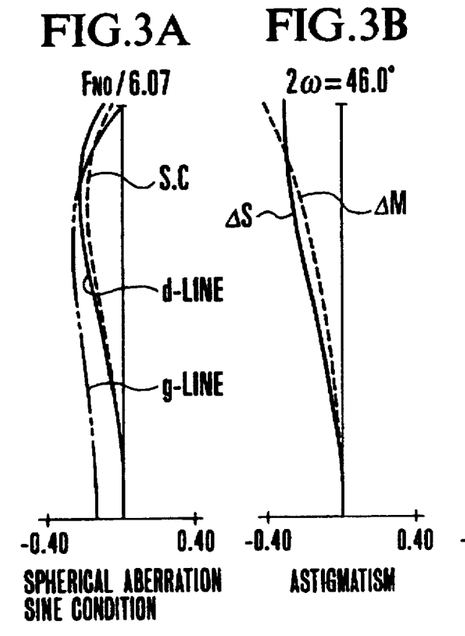
FIGS. 3A, 3B, 3C, and 3D are graphic representations of the aberrations of the numerical example 1 of the invention in a middle position.
Figure 3C:
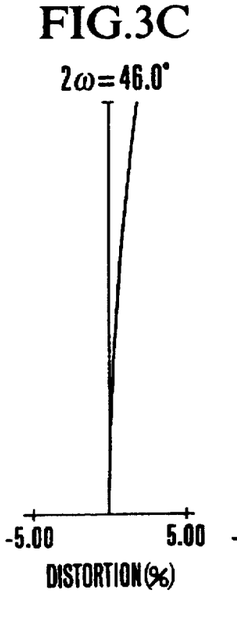
Figure 3D:
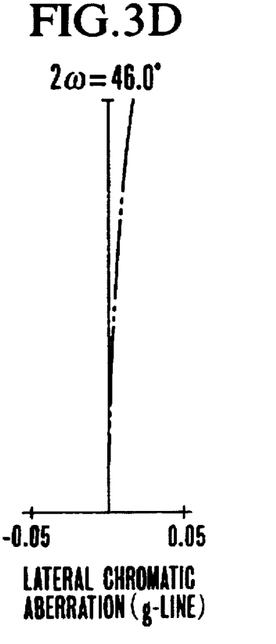
Figures 4A, 4B:
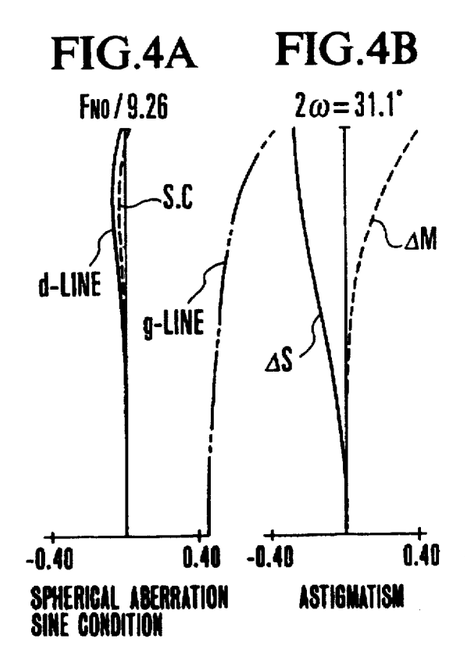
FIGS. 4A, 4B, 4C, and 4D are graphic representations of the aberrations of the numerical example 1 of the invention in the telephoto end.
Figure 4C:
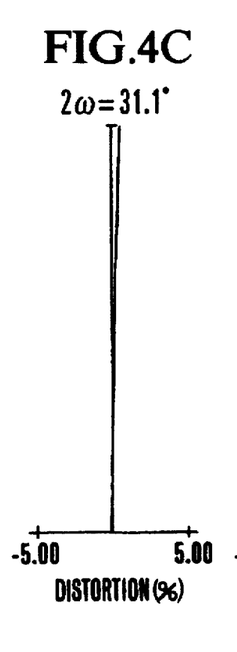
Figure 4D:
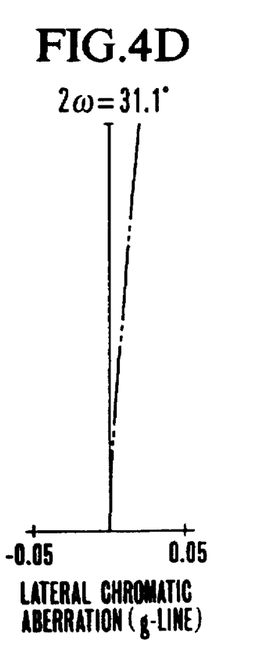
Figure 5A:
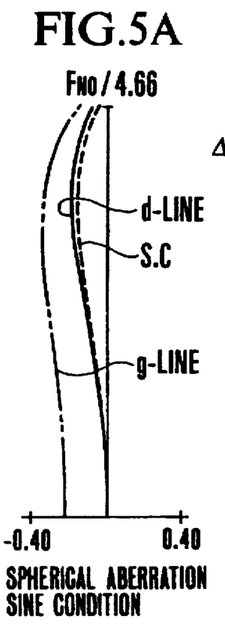
FIGS. 5A, 5B, 5C, and 5D are graphic representations of the aberrations of a numerical example 2 of the invention in the wide-angle end.
Figure 5B:
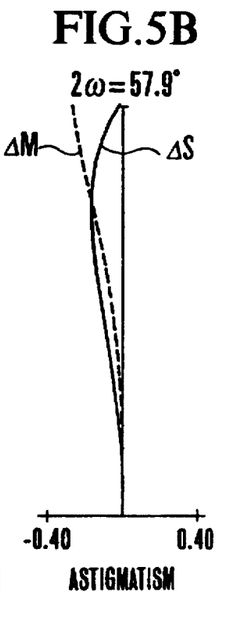
Figure 5C:
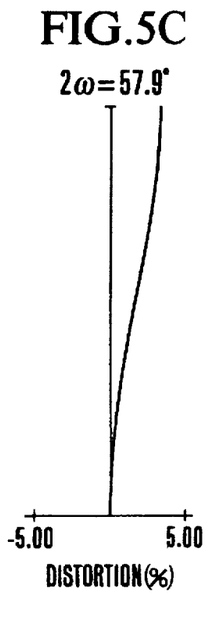
Figure 5D:
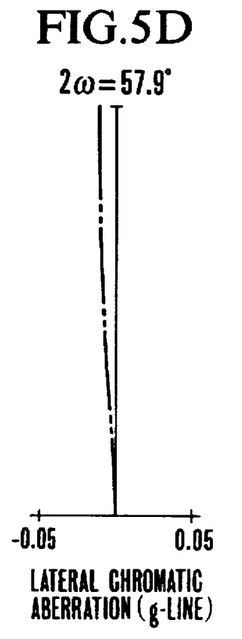
Figure 6A:
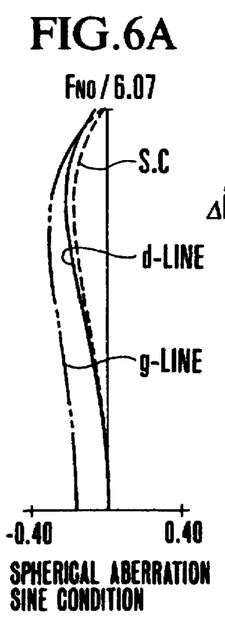
FIGS. 6A, 6B, 6C, and 6D are graphic representations of the aberrations of the numerical example 2 of the invention in a middle position.
Figure 6B:
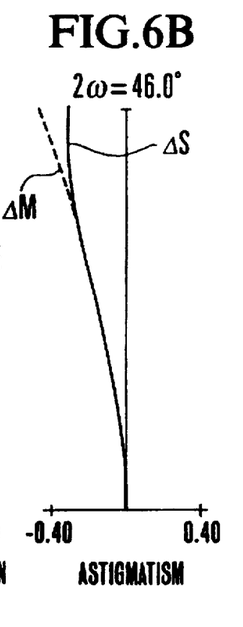
Figure 6C:
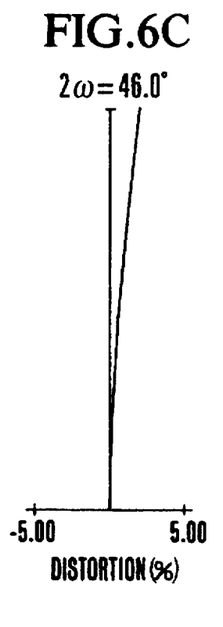
Figure 6D:
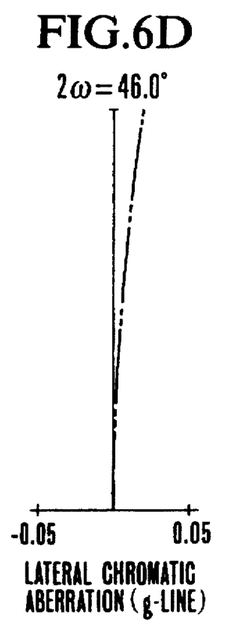
Figures 7A, 7B:
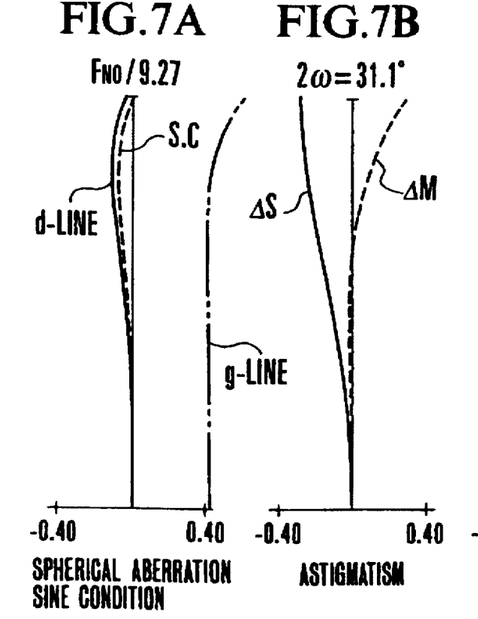
FIGS. 7A, 7B, 7C, and 7D are graphic representations of the aberrations of the numerical example 2 of the invention in the telephoto end.
Figures 7C, 7D:
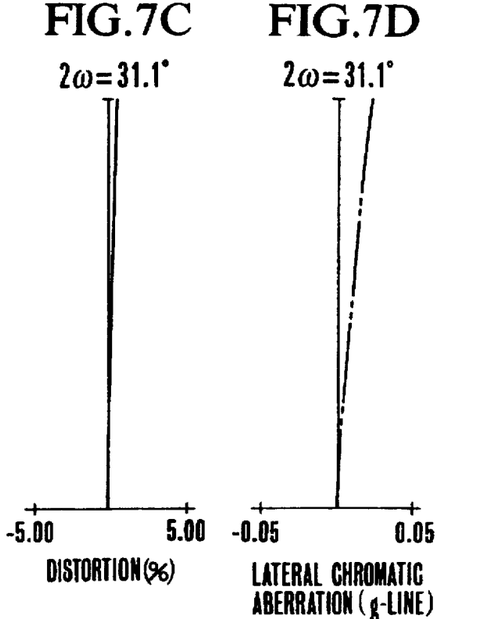
Figures 8A, 8B:
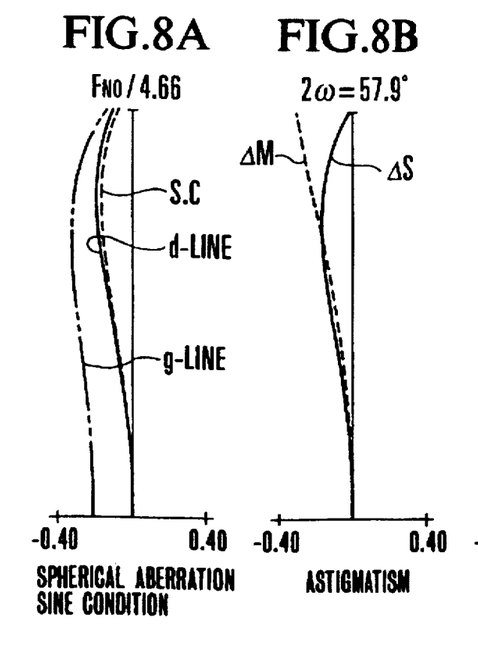
FIGS. 8A, 8B, 8C, and 8D are graphic representations of the aberrations of a numerical example 3 of the invention in the wide-angle end.
Figures 8C, 8D:
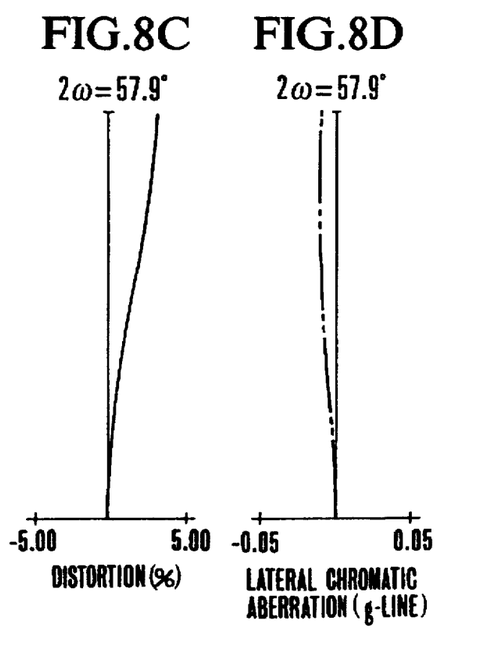
Figure 9A:
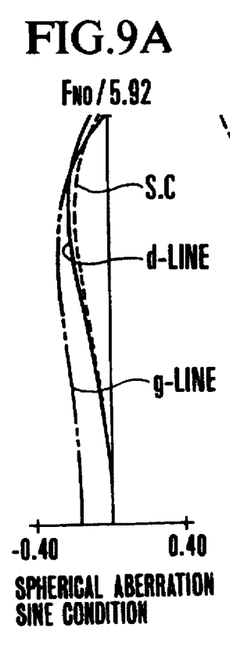
FIGS. 9A, 9B, 9C, and 9D are graphic representations of the aberrations of the numerical example 3 of the invention in a middle position.
Figure 9B:
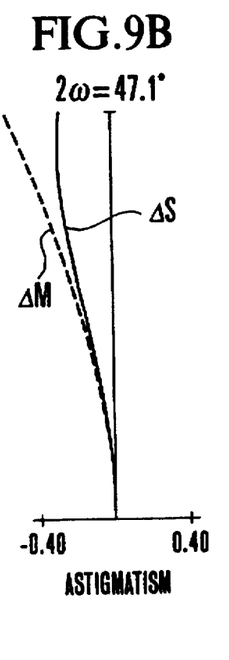
Figure 9C:
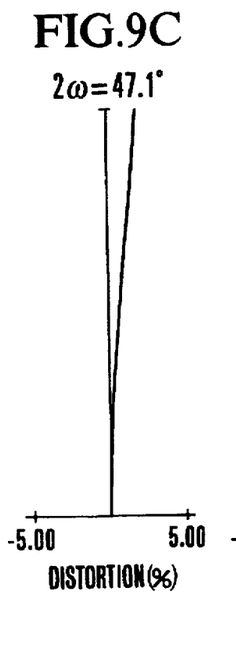
Figure 9D:
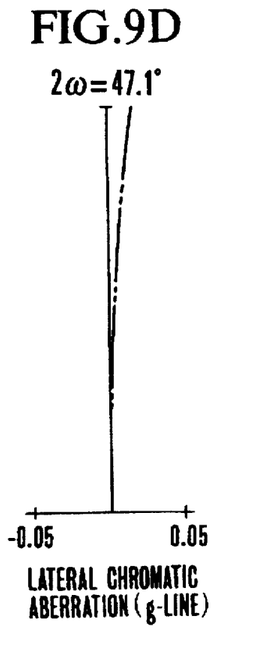
Figure 10A:
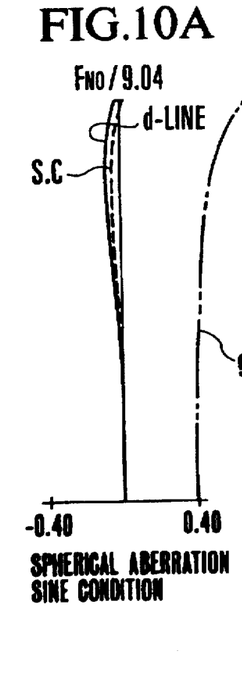
FIGS. 10A, 10B, 10C, and 10D are graphic representations of the aberrations of the numerical example 3 of the invention in the telephoto end.
Figure 10B:
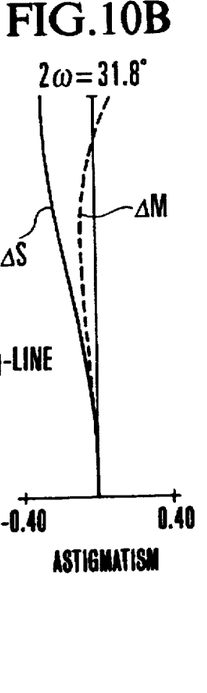
Figure 10C:
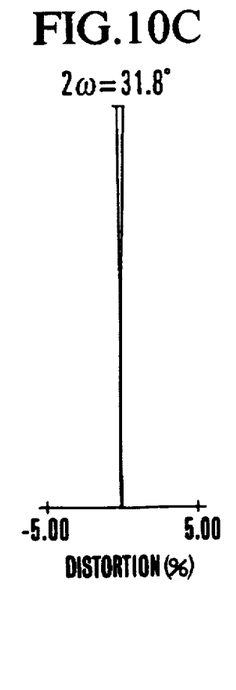
Figure 10D:
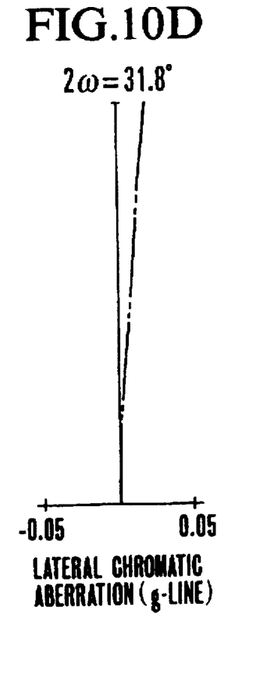
Figures 11A, 11B:
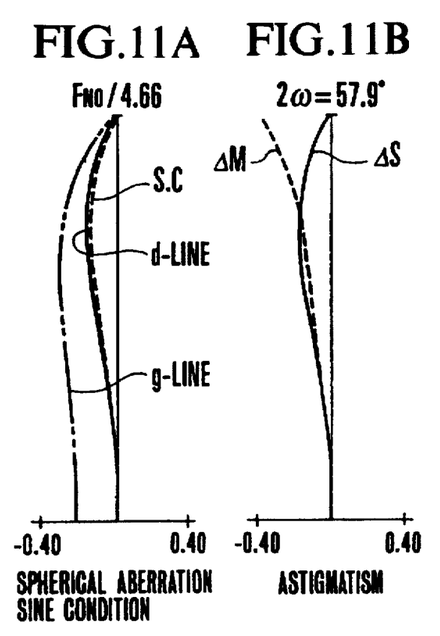
FIGS. 11A, 11B, 11C, and 11D are graphic representations of the aberrations of a numerical example 4 of the invention in the wide-angle end.
Figure 11C:
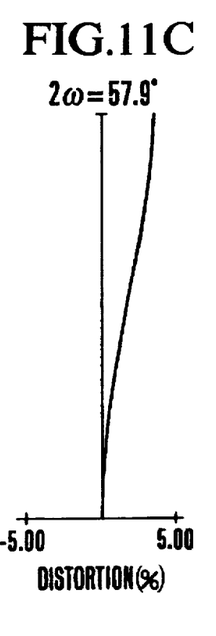
Figure 11D:
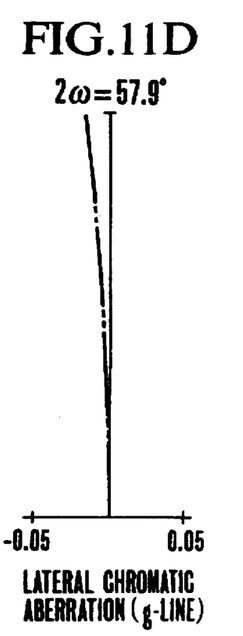
Figures 12A, 12B:
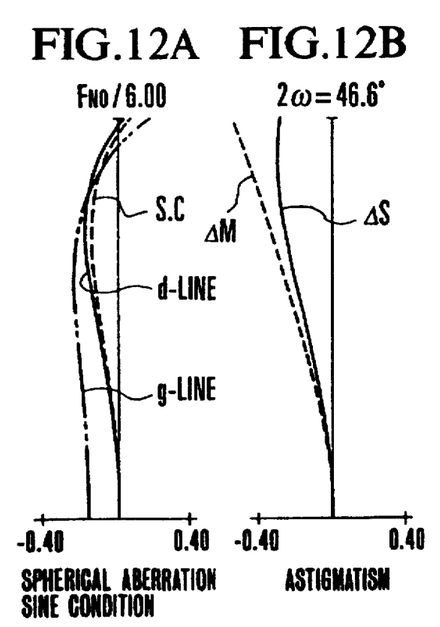
FIGS. 12A, 12B, 12C, and 12D are graphic representations of the aberrations of the numerical example 4 of the invention in a middle position.
Figure 12C:
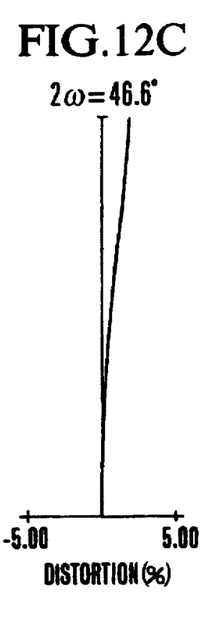
Figure 12D:
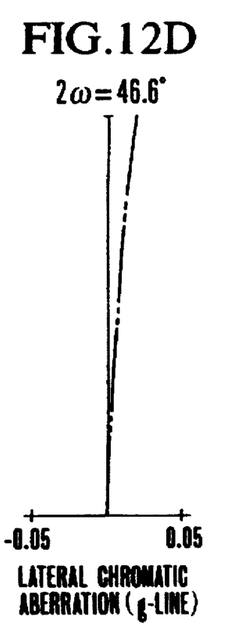
Figures 13A, 13B:
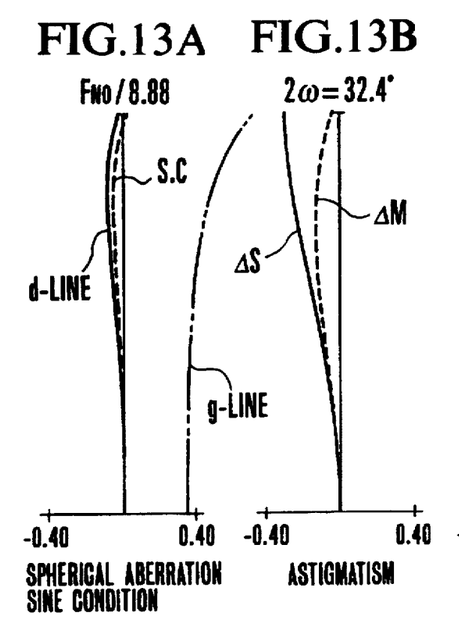
FIGS. 13A, 13B, 13C, and 13D are graphic representations of the aberrations of the numerical example 4 of the invention in the telephoto end.
Figure 13C:
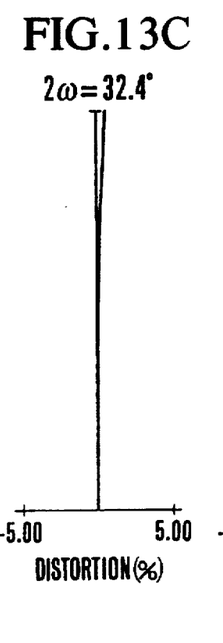
Figure 13D:
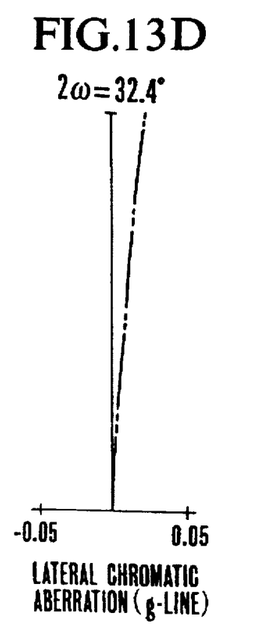
Figures 14A, 14B:
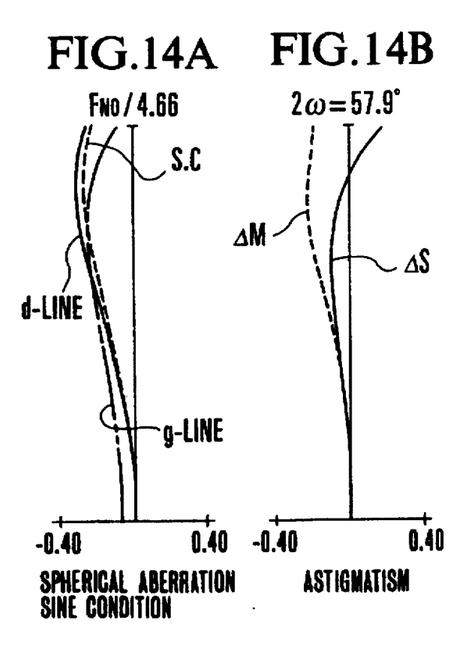
FIGS. 14A, 14B, 14C, and 14D are graphic representations of the aberrations of a numerical example 5 of the invention in the wide-angle end.
Figure 14C:
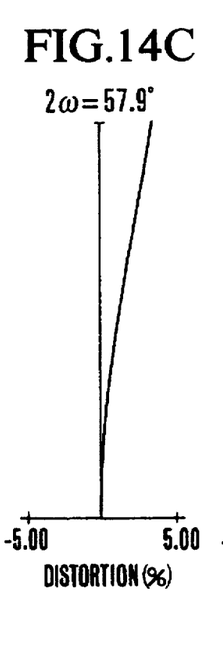
Figure 14D:
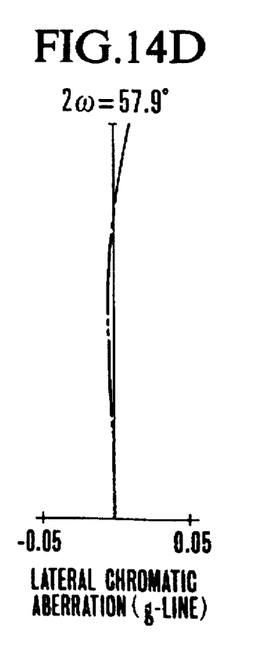
Figure 15A:
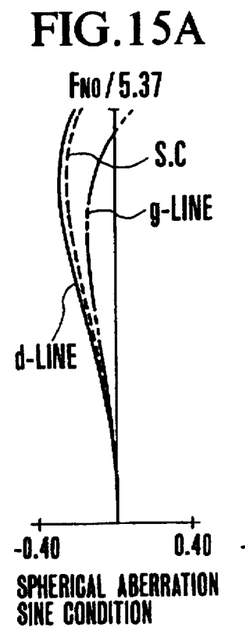
FIGS. 15A, 15B, 15C, and 15D are graphic representations of the aberrations of the numerical example 5 of the invention in a middle position.
Figure 15B:
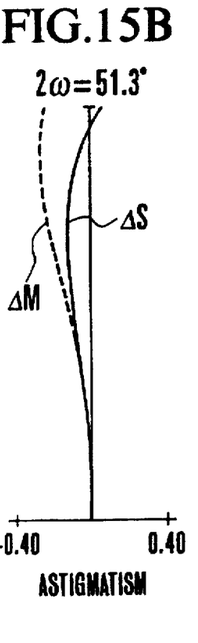
Figure 15C:
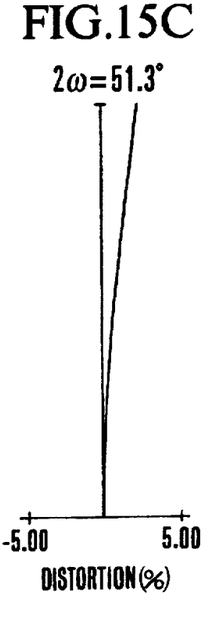
Figure 15D:
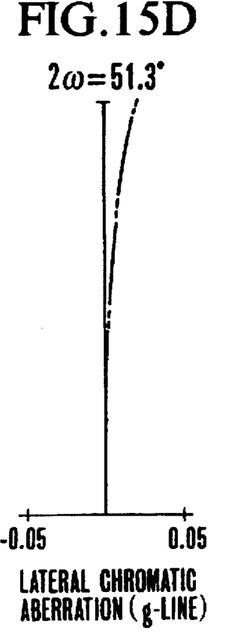
Figures 16A, 16B:
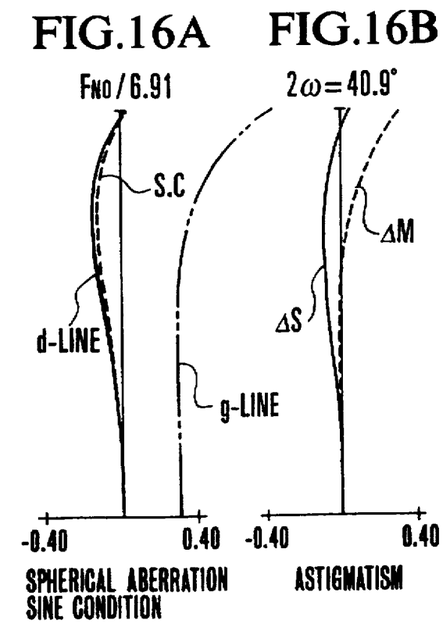
FIGS. 16A, 16B, 16C, and 16D are graphic representations of the aberrations of the numerical example 5 of the invention in the telephoto end.
Figure 16C:
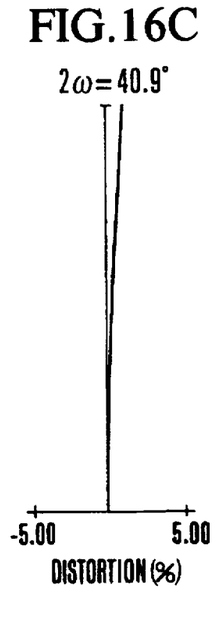
Figure 16D:
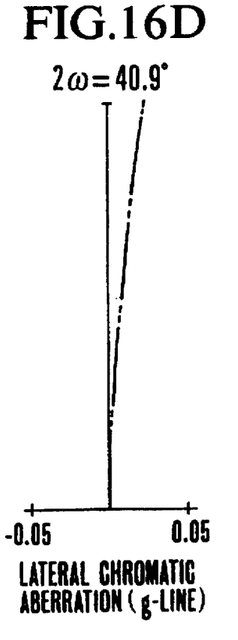

FIGS. 1(A) and 1(B) are longitudinal section views of the numerical example 1 of a zoom lens of the invention, FIG. 1(A) showing a zooming position for the wide-angle end and FIG. 1(B) another zooming position for the telephoto end.

In these figures, reference character L1 denotes the first lens unit of positive refractive power, and reference character L2 denotes the second lens unit of negative refractive power. The first and second lens units L1 and L2 axially move toward the object side as indicated by the arrows, while simultaneously decreasing the separation between the first and second lens units L1 and L2, when zooming from the wide-angle end to the telephoto end. A stop SP is, in the invention, arranged on the image side of the first lens unit L1 upon zooming to move in unison with the first lens unit L1.

In the present embodiment, by using such a zoom type and the form and the construction and arrangement of the constituent lenses described above, the variation of aberrations with zooming is well corrected over a range of about 2 in such a manner that the total length of the entire system is shortened, particularly that widening of the maximum angular field and shortening of the total length of the entire system are done at once. Thus, good stability of high optical performance is maintained throughout the entire zooming range.

Next, the features of the 2-unit zoom lens of the invention are explained below.

The first lens unit of positive refractive power is constructed with at least one negative lens and at least two positive lenses. Such a construction and arrangement of the constituent lenses allows mainly spherical aberration and coma to be corrected well. Further, these two positive lenses are made up of different materials from each other, thus increasing the degree of freedom for choice of materials. This leads to providing a possibility of well correcting chromatic aberrations. Another possibility is of reducing the deterioration of the optical performance due to the relative decentering of the negative and positive lenses in the first lens unit.

In general, the use of the plus-minus refractive power arrangement in the 2-unit zoom lens brings the second lens unit to positions near the image plane. Therefore, it gets a large diameter. If the second lens unit is made up by an increased number of lens elements, this is just reflected to rapidly increase the size of the entire system.

So, in the invention, two lenses of certain forms are used when to construct the second lens unit. In the invention, for the purpose of reducing the size of the entire lens system, the refractive power of the second lens unit is made relatively strong as is shown in the condition (2a) or (2b) described before. Along with this, an aspheric surface is used in the second lens unit in order to correct the variation of aberrations owing to the increase of the refractive power of the second lens unit. As the negative second lens in the second lens unit is provided with the concave surface toward the object side, distortion which takes the pincushion type in the wide-angle end is mainly corrected well.

The small-sized zoom lens of the invention is formed on the fundamentals of lens design that the entire system comprises, from front to rear, the first lens unit of positive refractive power and the second lens unit of negative refractive power, zooming being performed by varying the separation between the first and second lens units, that the first lens unit has a negative lens and at least two positive lenses, that the second lens unit has a first lens and a negative second lens having a concave surface facing the object side, and that the second lens unit has at least one aspheric surface.

Within the framework of these fundamentals, the constituent lenses are so formed as to satisfy the conditions (1a), (2a), (3a) and (4a) described before, and, for the purpose of achieving further improvements of the optical performance, as to satisfy the additional condition (5a) or (6a). For another case, within the framework of these fundamentals, the constituent lenses are so formed as to satisfy the conditions (1b) and (2b) and either (5b) or (6b) described before and, for the purpose of achieving further improvements of the optical performance, as to satisfy the conditions (3b) and (4b) described before.

The technical significance of each of the before-described conditions (1a) to (6a) and (1b) to (6b) is explained below.

When the upper limit of the condition (1a) or (1b) is exceeded, as this means that the focal length of the first lens unit is too long, the back focal distance becomes short, causing the lens diameter to increase. When the lower limit is exceeded, as this means that the power of the first lens unit is too strong, it becomes difficult to well correct aberrations by using as small a number of lens elements as four in the first lens unit.

When the upper limit of the condition (2a) or (2b) is exceeded, as this means that the focal length of the second lens unit is too long and, therefore, that the ratio of the total length of the entire system to the focal length of the entire system, or the so-called telephoto ratio, is too large, it becomes difficult to shorten the total length of the entire system. Particularly, for the purpose of reducing the size of the entire system, it is preferred to alter the upper limit to 0.60 or thereabout. When the lower limit is exceeded, as this means that the power of the second lens unit is too strong, it becomes difficult to correct aberrations well by using two lenses as in the invention.

The inequalities of condition (3a) or (3b) are concerned with the material of the front or first lens in the second lens unit and have an aim chiefly to correct chromatic aberrations well by a low cost. When the lower limit is exceeded, the material of the lens must be of ultralow dispersion. So, the cost becomes very high. When the upper limit is exceeded, the material of the lens must be either of ultrahigh dispersion or of low dispersion and high refractive index. This results in an increase of the difficulty of correcting chromatic aberrations well or an increase of the cost.

The inequalities of condition (4a) or (4b) are concerned with the ratio of the focal lengths of the first and second lenses in the second lens unit. When the upper limit is exceeded, the refractive power of the first lens becomes negative. So, the variation of lateral chromatic aberration owing to the second lens unit increases objectionably. Particularly, for the purpose of achieving a higher performance, it is desirable that the refractive power of the first lens is made positive and that the upper limit is altered to 0.000. When the lower limit is exceeded, the refractive power of the first lens becomes positive and its value increases. Therefore, the deterioration of the optical performance due to the relative decentering of the two lenses in the second lens unit becomes large.

Incidentally, in the invention, it is recommended that the first lens is made of plastic and further that an aspheric surface is applied thereto. However, in this case, if the lower limit of the condition (4a) or (4b) is exceeded, the shift of the image focus with variation of the temperature increases greatly. So, it is no good.

The inequalities of condition (5a) or (5b) and (6a) or (6b) are concerned with the material of the rear or second lens in the second lens unit and have an aim chiefly to correct well chromatic aberrations and image characteristics. In addition, the second lens takes its place near the image plane in the wide-angle end, causing not only its diameter to become large, but also the radii of curvature of its surfaces to become small. Therefore, the material is desired to be feasible for manufacturing. In general, materials of low dispersion and high refractive index are hardly susceptible to machining, while materials of low dispersion and low refractive index are easy to machine. The upper limit of the condition (5a) or (5b) excludes the materials of low dispersion and high refractive index. When the lower limit is exceeded, as this means that a material of not very low dispersion and high refractive index is used, chromatic aberrations become difficult to correct.

When the upper limit of the condition (6a) or (6b) is exceeded, the image characteristics deteriorate objectionably.

Further, to achieve improvements of the optical performance over the entire area of the image frame, it is better to form the constituent lenses of the lens units as follows:

(i) Letting the Abbe number of the material of the first lens in the second lens unit be denoted by v2F, $$v2F < 55 \qquad (7)$$

is satisfied.

The inequality of condition (7) is concerned with the Abbe number of the material of the front or first lens in the second lens unit. When a material of lower dispersion than this upper limit is used, it becomes difficult to well correct chromatic aberrations as the first lens in the second lens unit is made to be a positive lens of somewhat strong refractive power.

(ii) The first lens unit is constructed as comprising, from front to rear, a positive first lens, a negative second lens, a positive third lens and a positive fourth lens, wherein letting the refractive index and Abbe number of the material of the first lens in the first lens unit be denoted by N11 and v11, respectively.

$$1.651 < \nu 11 + \nu 11/100 < 2.201 \quad (8)$$

or $$N11 < 1.65 \quad (9)$$

is satisfied.

By using such four lenses of predetermined refractive powers in the first lens unit, spherical aberration and coma are mainly corrected well.

The inequalities of conditions (8) and (9) are concerned with the material of the frontmost or first lens, as the first lens unit is constructed with four lenses of plus-minus-plus-plus power arrangement. Similarly to the conditions (5a) or (5b) and (6a) or (6b) described before, it is desired that materials of low dispersion and high refractive index are not used.

The upper limit of the condition (8) excludes the materials of low dispersion and high refractive index. When the lower limit is exceeded, as this means that a material of not very low dispersion and high refractive index is used, chromatic aberrations become difficult to correct. When the upper limit of the condition (9) is exceeded, it becomes difficult to keep good image characteristics.

Next, numerical examples 1 to 5 of the invention are shown. In the numerical data for the examples 1 to 5, Ri is the radius of curvature of the i-th lens surface, when counted from the object side, Di is the axial lens thickness or air separation, when counted from the object side, and Ni and vi are respectively the refractive index and Abbe number of the material of the i-th lens element when counted from the object side.

The values of the factors in the conditions for the numerical examples 1 to 5 are listed in Table-1. The shape of the aspheric surface is expressed in the coordinates with an X axis in the axial direction and an H axis in the perpendicular direction to the optical axis, the direction in which light advances being taken as positive, by the following equation:

$$X = (1/R)H^2/(1 + \sqrt{1-(H/R)^2}) + AH^2 + BH^4 + CH^6 + DH^8 + EH^{10}$$

where R is the radius of the osculating sphere, and A, B, C, D and E are the aspheric coefficients.

Numerical Example 1:

| f = 39.14–77.81 | Fno = 4.66–9.26 | | 2ω = 57.9°–31.1° |
|---|---|---|---|
| R1 = 14.59 | D1 = 2.00 | N1 = 1.57098 | v1 = 50.8 |
| R2 = 82.98 | D2 = 1.00 | | |
| R3 = −17.03 | D3 = 3.29 | N2 = 1.83400 | v2 = 37.2 |
| R4 = 22.17 | D4 = 0.20 | | |
| R5 = 37.75 | D5 = 3.52 | N3 = 1.48749 | v3 = 70.2 |
| R6 = −16.01 | D6 = 0.15 | | |
| R7 = 42.22 | D7 = 2.30 | N4 = 1.53256 | v4 = 45.9 |
| R8 = −17.95 | D8 = 1.20 | | |
| R9 = Stop | D9 = Variable | | |
| R10 = −40.99 | D10 = 2.00 | N5 = 1.58306 | v5 = 30.2 |
| R11 = −30.26 | D11 = 6.00 | | |
| R12 = −10.14 | D12 = 1.10 | N6 = 1.69679 | v6 = 55.5 |
| R13 = −38.76 | | | |

| Variable | Focal length | | |
|---|---|---|---|
| Separation | 39.14 | 50.99 | 77.81 |
| D9 | 9.47 | 6.03 | 2.11 |

The Values of the Aspheric Coefficients for R10

| A = 0.0 | B = 5.684 × 10⁻⁵ | C = 5.004 × 10⁻⁷ |
|---|---|---|
| D = 2.766 × 10⁻¹¹ | E = 0.0 | |

Numerical Example 2:

| f = 39.10–77.77 | Fno = 4.66–9.27 | | 2ω = 57.9°–31.1° |
|---|---|---|---|
| R1 = 14.77 | D1 = 2.00 | N1 = 1.56383 | v1 = 60.7 |
| R2 = 83.38 | D2 = 0.95 | | |
| R3 = −16.68 | D3 = 3.36 | N2 = 1.80609 | v2 = 41.0 |
| R4 = 21.70 | D4 = 0.19 | | |
| R5 = 35.11 | D5 = 3.41 | N3 = 1.48749 | v3 = 70.2 |
| R6 = −16.07 | D6 = 0.15 | | |
| R7 = 44.17 | D7 = 2.32 | N4 = 1.53171 | v4 = 48.9 |
| R8 = −17.97 | D8 = 1.20 | | |
| R9 = Stop | D9 = Variable | | |
| R10 = −39.95 | D10 = 2.00 | N5 = 1.58306 | v5 = 30.2 |
| R11 = −29.96 | D11 = 6.02 | | |
| R12 = −10.15 | D12 = 1.10 | N6 = 1.69679 | v6 = 55.5 |
| R13 = −38.43 | | | |

| Variable | Focal length | | |
|---|---|---|---|
| Separation | 39.10 | 50.97 | 77.77 |
| D9 | 9.50 | 6.05 | 2.13 |

The Values of the Aspheric Coefficients for R10

| A = 0.0 | B = 5.815 × 10⁻⁵ | C = 4.717 × 10⁻⁷ |
|---|---|---|
| D = 3.099 × 10⁻¹⁰ | E = 0.0 | |

Numerical Example 3:

| f = 39.10–75.89 | Fno = 4.66–9.04 | | 2ω = 57.9°–31.8° |
|---|---|---|---|
| R1 = 14.64 | D1 = 2.00 | N1 = 1.57098 | v1 = 50.8 |
| R2 = 83.49 | D2 = 0.94 | | |
| R3 = −17.28 | D3 = 3.25 | N2 = 1.83400 | v2 = 37.2 |
| R4 = 21.90 | D4 = 0.22 | | |
| R5 = 40.22 | D5 = 3.72 | N3 = 1.51633 | v3 = 64.2 |
| R6 = −17.12 | D6 = 0.15 | | |
| R7 = 41.07 | D7 = 2.37 | N4 = 1.53171 | v4 = 48.9 |
| R8 = −17.90 | D8 = 1.20 | | |
| R9 = Stop | D9 = Variable | | |
| R10 = −40.66 | D10 = 2.00 | N5 = 1.58306 | v5 = 30.2 |
| R11 = −29.32 | D11 = 5.94 | | |
| R12 = −10.16 | D12 = 1.10 | N6 = 1.69679 | v6 = 55.5 |
| R13 = −40.83 | | | |

| Variable | Focal length | | |
|---|---|---|---|
| Separation | 39.10 | 49.67 | 75.89 |
| D9 | 9.22 | 6.11 | 2.13 |

The Values of the Aspheric Coefficients for R10

| A = 0.0 | B = 5.734 × 10⁻⁵ | C = 4.279 × 10⁻⁷ |
|---|---|---|
| D = 4.256 × 10⁻¹⁰ | E = 0.0 | |

Numerical Example 4:

| f = 39.10–74.49 | Fno = 4.66–8.88 | | 2ω = 57.9°–32.4° |
|---|---|---|---|
| R1 = 14.76 | D1 = 2.00 | N1 = 1.58267 | v1 = 46.4 |
| R2 = 79.15 | D2 = 0.93 | | |
| R3 = −16.47 | D3 = 3.26 | N2 = 1.83400 | v2 = 37.2 |
| R4 = 21.87 | D4 = 0.20 | | |
| R5 = 35.94 | D5 = 3.04 | N3 = 1.48749 | v3 = 70.2 |
| R6 = −15.74 | D6 = 0.15 | | |
| R7 = 41.29 | D7 = 2.44 | N4 = 1.54072 | v4 = 47.2 |
| R8 = −17.31 | D8 = 1.20 | | |

-continued

| R9 = Stop | D9 = Variable | | |
|---|---|---|---|
| R10 = −37.30 | D10 = 2.00 | N5 = 1.58306 | ν5 = 30.2 |
| R11 = −30.76 | D11 = 6.02 | | |
| R12 = −9.26 | D12 = 1.10 | N6 = 1.60311 | ν6 = 60.7 |
| R13 = −36.12 | | | |

| Variable | Focal length | | |
|---|---|---|---|
| Separation | 39.10 | 50.23 | 74.49 |
| D9 | 9.04 | 6.82 | 2.13 |

The Values of the Aspheric Coefficients for R10:

| A = 0.0 | B = 7.247 × 10⁻⁵ | C = 4.969 × 10⁻⁷ |
|---|---|---|
| D = 3.200 × 10⁻⁹ | E = 0.0 | |

Numerical Example 5:

| f = 39.10–58.00 | Fno = 4.66–6.91 | 2ω = 57.9°–40.9° | |
|---|---|---|---|
| R1 = 13.24 | D1 = 1.90 | N1 = 1.57098 | ν1 = 50.8 |
| R2 = 262.20 | D2 = 0.73 | | |
| R3 = −17.30 | D3 = 1.20 | N2 = 1.83400 | ν2 = 37.2 |
| R4 = 25.06 | D4 = 1.13 | | |
| R5 = 181.14 | D5 = 4.09 | N3 = 1.51633 | ν3 = 64.2 |
| R6 = −14.31 | D6 = 0.15 | | |
| R7 = 74.58 | D7 = 2.15 | N4 = 1.58312 | ν4 = 59.4 |
| R8 = −22.60 | D8 = 1.30 | | |
| R9 = Stop | D9 = Variable | | |
| R10 = −30.93 | D10 = 1.80 | N5 = 1.58306 | ν5 = 30.2 |
| R11 = −25.21 | D11 = 6.39 | | |
| R12 = −11.19 | D12 = 1.20 | N6 = 1.69679 | ν6 = 55.5 |
| R13 = −54.85 | | | |

| Variable | Focal length | | |
|---|---|---|---|
| Separation | 39.10 | 45.03 | 58.00 |
| D9 | 7.58 | 5.71 | 2.94 |

The Values of the Aspheric Coefficients for R10

| A = 0.0 | B = 3.441 × 10⁻⁵ | C = 5.133 × 10⁻⁷ |
|---|---|---|
| D = −6.640 × 10⁻⁹ | E = 7.402 × 10⁻¹¹ | |

TABLE 1

| Condition | Numerical Example | | | | |
|---|---|---|---|---|---|
| Factor | 1 | 2 | 3 | 4 | 5 |
| f1/fw | 0.650 | 0.650 | 0.644 | 0.639 | 0.624 |
| |f2/fw| | 0.583 | 0.583 | 0.581 | 0.583 | 0.584 |
| N2F − (ν2F/200) | 1.432 | 1.432 | 1.432 | 1.432 | 1.432 |
| f2R/f2F | −0.108 | −0.105 | −0.116 | −0.078 | −0.097 |
| N2R + ν2R/125 | 2.141 | 2.141 | 2.141 | 2.089 | 2.141 |
| N2R | 1.697 | 1.697 | 1.697 | 1.603 | 1.697 |
| ν2F | 30.2 | 30.2 | 30.2 | 30.2 | 30.2 |
| N11 + ν11/100 | 2.079 | 2.171 | 2.079 | 2.047 | 2.079 |
| N11 | 1.571 | 1.564 | 1.571 | 1.583 | 1.571 |

According to the invention as applied to the zoom lens in which zooming is performed by moving two lens units of predetermined refractive powers, the rules of lens design are set forth as described before, thereby making it possible to greatly shorten the total length of the entire lens system. Thus, a small-sized zoom lens of simple form can be achieved which has a range of about 2 and is well corrected for high optical performance throughout the entire zooming range.

What is claimed is:

1. A small-sized zoom lens comprising, from front to rear, a first lens unit of positive refractive power and a second lens unit of negative refractive power, zooming being performed by varying a separation between said first and second lens units, wherein said first lens unit comprises, in order from the object side to the image side, a bi-concave negative lens and at least two positive lenses, said second lens unit has a first lens and a second lens of negative refractive power having a concave surface facing an object side, and said second lens unit has at least one aspheric surface, and wherein letting focal lengths of said first and second lens units be denoted by f1 and f2, respectively, a shortest focal length of said zoom lens by fw, a refractive index and an Abbe number of a material of said first lens by N2F and ν2F, respectively, a refractive index of a material of said second lens by N2R, and focal lengths of said first and second lenses by f2F and f2R, respectively, the following conditions are satisfied:

$$0.4 < f1/fw < 0.9$$

$$0.444 < |f2/fw| < 0.671$$

$$1.055 < N2F − (ν2F/200) < 1.505$$

$$−0.142 < f2R/f2F < 0.078$$

$$N2R < 1.65.$$

2. A small-sized zoom lens according to claim 1 satisfying the following condition:

$$2.025 < N2R + ν2R/125 < 2.151$$

where ν2R is an Abbe number of a material of said second lens.

3. A small-sized zoom lens comprising, from front to rear, a first lens unit of positive refractive power and a second lens unit of negative refractive power, zooming being performed by varying a separation between said first and second lens units, wherein said first lens unit comprises four lenses, including, in order from the object side to the image side, a bi-concave negative lens and at least two positive lenses, said second lens unit has a first lens and a negative second lens having a concave surface facing an object side, and said second lens unit has at least one aspheric surface, wherein letting focal lengths of said first and second lens units be denoted by f1 and f2, respectively, a shortest focal length of said zoom lens by fw, and a refractive index and an Abbe number of said second lens by N2R and ν2R, respectively, the following conditions are satisfied:

$$0.4 < f1/fw < 0.9$$

$$0.444 < |f2/fw| < 0.671$$

$$2.025 < N2R + ν2R/125 < 2.151$$

$$−0.142 < f2R/f2F < 0.078,$$

wherein f2F and f2R are focal lengths of said first and second lenses, respectively, and wherein a rearmost lens of said first lens unit is a bi-convex lens.

4. A small-sized zoom lens according to claim 1 or 3, satisfying the following condition:

$$ν2F < 55$$

where ν2F is an Abbe number of a material of said first lens.

5. A small-sized zoom lens according to claim 1 or 3, wherein said first lens unit comprises, from front to rear, a positive first lens, a negative second lens, a positive third lens and a positive fourth lens, and wherein letting a refractive index and an Abbe number of a material of said first lens in said first lens unit be denoted by N11 and v11, respectively, the following condition is satisfied:

$$1.651 < N11 + v11/100 < 2.201.$$

6. A small-sized zoom lens according to claim 1 or 3, wherein said first lens unit comprises, from front to rear, a positive first lens, a negative second lens, a positive third lens and a positive fourth lens, and wherein letting a refractive index of a material of said first lens in said first lens unit be denoted by N11, the following condition is satisfied:

$$N11 < 1.65.$$

7. A small-sized zoom lens according to claim 3, satisfying the following condition:

$$1.055 < N2F - (v2F/200) < 1.505$$

where N2F and v2F are a refractive index and an Abbe number of a material of said first lens in said second lens unit, respectively.

8. A small-sized zoom lens according to claim 3, wherein said second lens unit consists of said first lens and said second lens.

9. A small-sized zoom lens comprising, from front to rear, a first lens unit of positive refractive power and a second lens unit of negative refractive power, zooming being performed by varying a separation between said first and second lens units, wherein said first lens unit comprises, in order from the object side to the image side, a bi-concave negative lens and at least two positive lenses, said second lens unit has a first lens and a negative second lens having a concave surface facing an object side, and said second lens unit has at least one aspheric surface, and wherein letting focal lengths of said first and second lens units be denoted by f1 and f2, respectively, a shortest focal length of said zoom lens by fw, and a refractive index of said second lens by N2R, the following conditions are satisfied:

$$0.4 < f1/fw < 0.9$$

$$0.444 < |f2/fw| < 0.671$$

$$N2R < 1.65$$

$$-0.142 < f2R/f2F < 0.078$$

wherein f2F and f2R represent a focal length of said first lens and said second lens, respectively.

10. A small-sized zoom lens according to claim 9, wherein said second lens unit consists of said first lens and said second lens.

11. A small-sized zoom lens comprising, from front to rear, a first lens unit of positive refractive power and a second lens unit of negative refractive power, zooming being performed by varying a separation between said first and second lens units, wherein said first lens unit comprises, in order from the object side to the image side, a bi-concave negative lens and at least two positive lenses, said second lens unit has a first lens and a second lens of negative refractive power having a concave surface facing an object side, and said second lens unit has at least one aspheric surface, wherein letting focal lengths of said first and second lens units be denoted by f1 and f2, respectively, a shortest focal length of said zoom lens by fw, a refractive index and an Abbe number of a material of said first lens by N2F and v2F, respectively, and focal lengths of said first and second lenses by f2F and f2R, respectively, the following conditions are satisfied:

$$0.4 < f1/fw < 0.9$$

$$0.444 < |f2/fw| < 0.671$$

$$1.055 < N2F - (v2F/200) < 1.505$$

$$-0.142 < f2R/f2F < 0.078, \text{ and}$$

wherein a rearmost lens of said first lens unit is a bi-convex lens.

12. A small-sized zoom lens comprising, from front to rear, a first lens unit of positive refractive power and a second lens unit of negative refractive power, zooming being performed by varying a separation between said first and second lens units, wherein said first lens unit comprises, in order from the object size to the image side, a negative lens and at least two positive lenses, said second lens unit has a first lens and a negative second lens having a concave surface facing an object side, and said second lens unit has at least one aspheric surface, wherein letting focal lengths of said first and second lens units be denoted by f1 and f2, respectively, a shortest focal length of said zoom lens by fw, and a refractive index and an Abbe number of said second lens by N2R and v2R, respectively, the following conditions are satisfied:

$$0.4 < f1/fw < 0.9$$

$$0.444 < |f2/fw| < 0.671$$

$$2.025 < N2R + v2R/125 < 2.151$$

$$-0.142 < f2R/f2F < 0.078,$$

wherein f2F and f2F are focal lengths of said first and second lenses, respectively, wherein a rearmost lens of said first lens unit is a bi-convex lens, and wherein said negative lens of said first lens unit is a bi-concave lens.

* * * * *

UNITED STATES PATENT AND TRADEMARK OFFICE
CERTIFICATE OF CORRECTION

PATENT NO. : 5,798,873
DATED : August 25, 1998
INVENTOR(S) : KOJI HOSHI, ET AL.

It is certified that error appears in the above-identified patent and that said Letters Patent is hereby corrected as shown below:

ON THE COVER PAGE:

Item [57] ABSTRACT:

Line 6, "positive lens," should read --positive lenses,--.

COLUMN 1:

Line 45, "the the" should read --the--.

UNITED STATES PATENT AND TRADEMARK OFFICE
CERTIFICATE OF CORRECTION

PATENT NO. : 5,798,873
DATED : August 25, 1998
INVENTOR(S) : KOJI HOSHI, ET AL.

It is certified that error appears in the above-identified patent and that said Letters Patent is hereby corrected as shown below:

COLUMN 11:

Line 48, "<0.078" should read --<0.078,--.

COLUMN 12:

Line 30, "size" should read --side--.

Signed and Sealed this

Fourth Day of May, 1999

Attest:

Q. TODD DICKINSON

*Attesting Officer*      *Acting Commissioner of Patents and Trademarks*